Dec. 27, 1960 L. W. STRAHLER 2,966,201
AUTOMOBILE SEAT AND CRADLE
Filed April 10, 1959
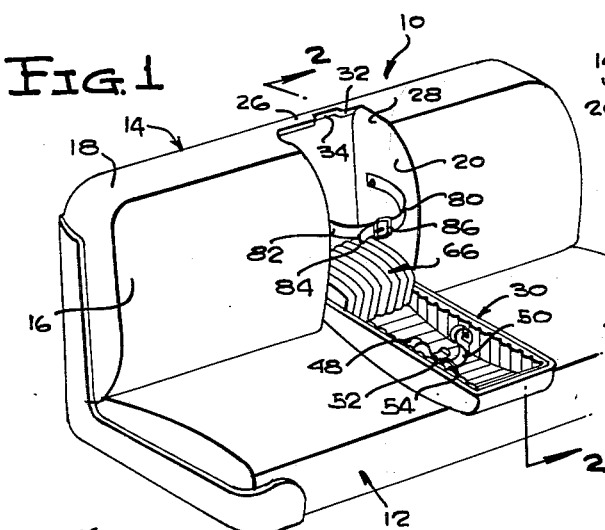
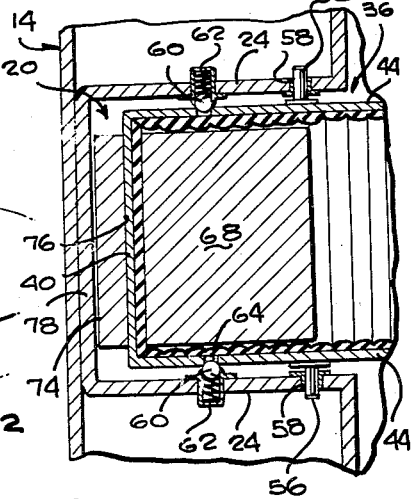
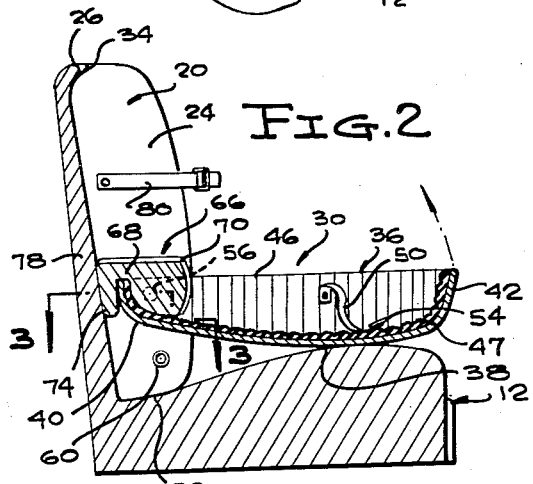
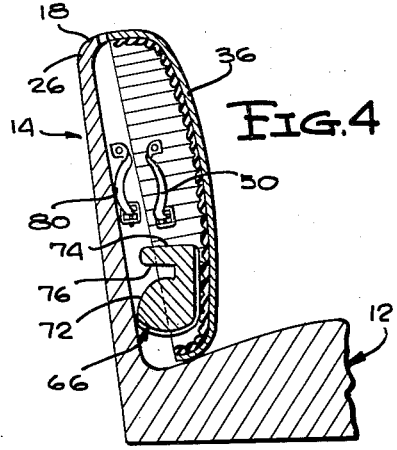
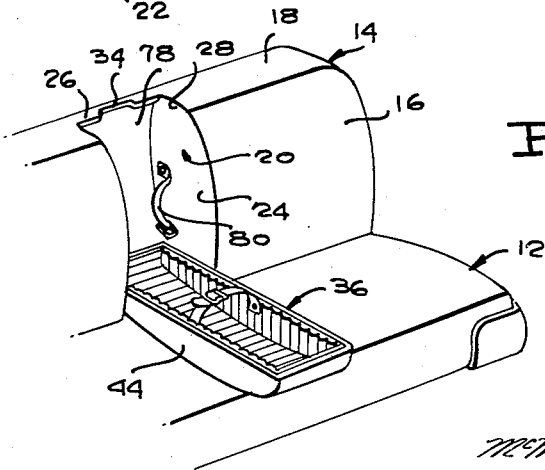
INVENTOR.
LOUIS W. STRAHLER
BY
McMorrow, Berman & Davidson
ATTORNEYS 2,966,201
AUTOMOBILE SEAT AND CRADLE
Louis W. Strahler, Rte. 2, Marietta, Ohio
Filed Apr. 10, 1959, Ser. No. 805,618
4 Claims. (Cl. 155—10)

This invention relates to an improved automobile seat back of the type involving a combined cradle and child's seat which nests in the seat back when not in use and folds forwardly and downwardly to use position.

The primary object of the invention is to provide a more practical and efficient seat back of the character indicated which is supported in its position of use upon the seat cushion of the structure, and which includes a removable child's seat which is supported on the cradle in the recess of the seat back in which the cradle is mounted.

Another object of the invention is to provide a structure of the character indicated above which is of simplified construction, has a minimum of simple and easily assembled parts, and which can be made in attractive and serviceable forms at relatively low cost.

Other important objects and advantageous features of the invention will be apparent from the following description and the accompanying drawings, wherein, for purposes of illustration only, a specific form of the invention is set forth in detail.

In the drawings:

Figure 1 is a perspective view of an automobile seat having a seat back and a seat cushion, and a combined cradle and child's seat mounted in a recess in the seat back and resting upon the seat cushion, in accordance with the present invention;

Figure 2 is an enlarged vertical transverse section taken on the line 2—2 of Figure 1;

Figure 3 is a further enlarged and fragmentary horizontal section taken on the line 3—3 of Figure 2;

Figure 4 is a view similar to Figure 2, showing the combined cradle and child's seat folded to storage position; and Figure 5 is a view like Figure 1, showing the child's seat removed.

Referring in detail to the drawings, wherein like numerals designate like parts throughout the several views, the numeral 10 generally designates the front or the rear seat of an automobile seat back 14 rising from and stationary relative to the seat cushion. The seat back 14 has a forward surface 16 and a top horizontal panel 18 which extends across the top of the back 14. In accordance with the present invention, the seat back 14, which is otherwise substantially conventional in form, is modified by the provision, preferably at the midlength point thereof, with a vertically elongated recess 20, which has an open lower end 22 exposing the seat cushion 12, which extends beneath the seat back 14, and sides which are defined by similar relatively rigid, vertically elongated side panels 24 which follow the cross sectional contours of the seat back 14.

The recess 20 is open at its upper end except as partially closed by the reduced width portion 26 of the top panel 18. The reduced width portion 26 is defined by a notch 28 made in the forward edge of the top panel 18 to a depth and a width corresponding to the depth or thickness and width of a cradle structure 30. The notch 28 has in its longitudinal edge 32 a cut-out 34 to facilitate reaching behind the cradle structure 30, when nested in the recess 20, for pulling the cradle structure down to its use position.

The cradle structure 30 is a combined cradle and child's seat and comprises an elongated trough 36 of rigid material, which is slightly less in length than the height of the recess 20 and is slightly less in width than the recess 20. The trough 36 comprises a bottom wall 38 of the same curvature as the forward surface 16 of the seat back 14, an arcuate rear end wall 40, a forward end wall 42 conforming in curvature and contour to the upper part of the seat back surface 16 and the top panel 18, so as to be flush with these portions of the seat back 14 when folded up into storage position in the recess 20, as shown in Figure 4. The trough 36 further comprises flat, parallel side walls 44 which preferably have straight, horizontal upper edges 46. The trough 36 is lined throughout with a lining 47 of cushioning material, preferably foam rubber or the like. At a point intermediate the ends of the trough 36, a safety belt extends across the interior of the trough and is composed of straps 48 and 50 which are secured at one end to related side walls 44 and have interengageable free and buckle-equipped ends 52 and 54, respectively, whereby an infant can be safely confined in the trough 36.

The trough 36 is securably hinged in the lower part of the recess 20 by means of longitudinally aligned pins or trunnions 56 which are suitably fixed to and project outwardly from rear parts of the trough side walls 44 on an axis which is substantially concentric with the arcuate rear end wall 40 of the trough. The trunnions 56 are rotatably engaged through tubular bearings 58 which are fixed in and traverse the recess side panels 24, at locations about midway between the forward and rear edges of the panels and at a height above the lower ends of the side panels 24, such that in its down-folded position of use, the trough 36 will nest upon the seat cushion 12, in a horizontal position, as shown in Figure 2.

For releasably holding the trough 36 in storage position in the recess 20, suitable releasable catch or detent means are provided, such as spring-pressed detent bolts 60 having suitable mountings 62 secured in the recess side panels 24, at points spaced below the pivotal axis of the trough 36, as shown in Figures 2 and 3, and arranged to project into and retainably engage indentations or holes 64 provided for their reception in the outer sides of the trough side walls 44 at locations spaced forwardly from their trunnions 56.

The cradle structure 30 further comprises a child's seat 66, which is a hollow, or as shown, a solid block or body 68 of rectangular horizontal cross section, to fit snugly in the rear part of the cradle trough 36, when in place. The body 68 has on its top and forward end a covering 70, preferably of foam rubber or the like. The body 68 has a preferably convexly curved bottom 72 to conform to the curvature of the cradle trough bottom wall, at the rear end thereof, and has, near its rear end 74, a vertical notch 76 to securably and removably receive the rear end wall of the cradle trough, as shown in Figure 2. The rear end 74 of the child's seat body 68 is flat and is disposed at a vertical angle suitable to bear supportably against the rear wall 78 of the recess 20, which can be the back wall of the seat back 14, when the trough 36 is in its horizontal position of use and the seat 66 is in place. The seat 66 serves as a seat in the cradle trough 36 for a child mature enough to maintain a seated posture on the seat 66, while an infant or baby reclines in the cradle trough 36.

For safely holding a child on the seat 66 there is provided a second safety belt which comprises straps 80 and 82 which are secured, at one end, to related recess side panels, at points spaced above the seat 66, and have interengageable free and buckle-equipped ends 84 and 86, respectively.

The child's seat 66 is required to be removed from the cradle trough 36, to enable the latter to be folded up to its storage position in the recess 20, and, as shown in Figure 4, can then be placed within the cradle trough, and stored therein. It is also to be noted that the cradle trough 36 is admirably suited to contain and store miscellaneous objects, such as gloves, cameras, books, for the use of the occupants of an automobile.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, an automobile seat cushion, a seat back rising above the seat cushion, said seat back having a forward surface, a vertical recess in said seat back opening to said forward surface and to the seat cushion, said recess having side panels, a cradle trough having a bottom wall, side walls, a rear end wall and a forward end wall, the rear part of the trough being disposed in the lower part of said recess between said side panels, means horizontally pivoting said cradle trough on the recess side panels at a point spaced above the seat cushion, said pivot means being located to enable said trough to be swung forwardly and downwardly from a storage position nested in said recess to a horizontal position of use wherein the trough rests upon said seat cushion, said seat back having a vertical back wall for said recess, said rear end wall of the trough being spaced forwardly from said back wall in the horizontal position of the trough, and a child's seat removably supported on said rear end wall of the trough in the open position of the trough and positioned in said recess, said child's seat comprising a body having a bottom having a portion to rest upon the bottom wall of the trough, a rear end to bear against said back wall, and notch means in the bottom of the seat body receiving the rear end wall of the trough and baby restraining strap means secured to and extending between the recess side panels above the seat.

2. In combination, an automobile seat having a vertical back cushion and a horizontal seat cushion at the lower end of the back cushion, a recess formed in the front of said back cushion and having sides and a backwall, a cradle trough having a bottom wall and an upstanding rear end wall, said trough having a rear end portion engaged in the recess and horizontally pivoted therein on the recess sides to swing from an erect position within the recess to a horizontal depressed position resting upon the seat cushion, and a removable seat comprising a body having a notch in its under side engaged over the rear end wall of the trough in the depressed position of the trough, said seat having a rear end engaged in the recess with the recess backwall.

3. In combination, an automobile seat having a vertical back cushion and a horizontal seat cushion at the lower end of the back cushion, a recess formed in the front of said back cushion and having sides and a backwall, a cradle trough having a bottom wall and an upstanding rear end wall, said trough having a rear end portion engaged in the recess and horizontally pivoted therein on the recess sides to swing from an erect position within the recess to a horizontal depressed position resting upon the seat cushion, and a removable seat comprising a body having a notch in its under side engaged over the rear end wall of the trough in the depressed position of the trough, said seat having a rear end engaged in the recess with the recess backwall, said seat being narrower than the recess and the trough to be storable in the trough between the trough bottom wall and the recess backwall when removed from the rear end wall of the trough and with the trough in its erect position in the recess.

4. In combination, an automobile seat having a vertical back cushion and a horizontal seat cushion at the lower end of the back cushion, said back cushion being formed with a relatively narrow vertical recess opening to the seat cushion and to the front of the back cushion, said recess having sides and a back wall, a cradle trough having a rear end portion positioned in the recess, means pivoting the trough on the recess sides on a level spaced above the seat cushion, said trough having sidewalls and and upstanding rear end wall, said trough being forwardly swingable from a storage position in the recess to a depressed operative position resting upon the seat cushion, and a removable seat engaged in the recess, said seat being narrower than the recess and the trough, said seat having a rear end, a forward end, and an undersurface, said undersurface being formed with a transverse notch located nearer to said rear end than to said forward end, said notch receiving the rear end wall of the trough with the seat forwardly overbalanced, the rear end of the seat being supportably engaged with the recess back wall with the major part of the length of the seat extending forwardly in the cradle trough.

References Cited in the file of this patent

UNITED STATES PATENTS

| 2,013,481 | Stonehill | Sept. 3, 1935 |
| 2,436,294 | Glatstein | Feb. 17, 1948 |
| 2,555,659 | Rose | June 5, 1951 |